US007898523B1

(12) United States Patent
Van Meter

(10) Patent No.: US 7,898,523 B1
(45) Date of Patent: Mar. 1, 2011

(54) DEVICE FOR CONTROLLING ON-SCREEN POINTER

(76) Inventor: Ronald Van Meter, Anna, IL (US)

( * ) Notice: Subject to any disclaimer, the term of this patent is extended or adjusted under 35 U.S.C. 154(b) by 903 days.

(21) Appl. No.: 11/734,613

(22) Filed: Apr. 12, 2007

Related U.S. Application Data

(60) Provisional application No. 60/804,310, filed on Jun. 9, 2006, provisional application No. 60/866,896, filed on Nov. 22, 2006.

(51) Int. Cl.
G09G 5/08 (2006.01)
(52) U.S. Cl. .................. 345/158; 345/159; 345/163; 345/165; 345/167
(58) Field of Classification Search ......... 345/156–169, 345/173, 175, 179; 715/163, 830, 810; 382/124, 382/115; 310/71, 90.5
See application file for complete search history.

(56) References Cited

U.S. PATENT DOCUMENTS

| 5,374,942 | A * | 12/1994 | Gilligan et al. ............. 345/157 |
| 5,650,831 | A * | 7/1997 | Farwell ..................... 348/734 |
| 6,091,401 | A * | 7/2000 | Chen et al. ................ 345/156 |
| 7,085,584 | B2 * | 8/2006 | Shima ..................... 455/550.1 |
| 7,479,946 | B2 * | 1/2009 | Fitch et al. ................ 345/173 |
| 7,489,296 | B2 * | 2/2009 | Nishino et al. ............. 345/157 |
| 7,719,517 | B2 * | 5/2010 | Larsen et al. .............. 345/163 |
| 2002/0067336 | A1 * | 6/2002 | Wegmuller et al. ......... 345/156 |
| 2003/0132918 | A1 * | 7/2003 | Fitch et al. ................ 345/173 |
| 2003/0222856 | A1 * | 12/2003 | Fedorak et al. ............ 345/173 |
| 2004/0017355 | A1 * | 1/2004 | Shim ......................... 345/157 |
| 2004/0178989 | A1 * | 9/2004 | Shahoian et al. ........... 345/156 |
| 2005/0162389 | A1 * | 7/2005 | Obermeyer et al. ........ 345/161 |
| 2006/0007151 | A1 * | 1/2006 | Ram ......................... 345/163 |
| 2006/0116578 | A1 * | 6/2006 | Grunwald et al. .......... 600/440 |
| 2006/0221351 | A1 * | 10/2006 | Yu et al. ................... 356/615 |
| 2006/0250377 | A1 * | 11/2006 | Zadesky et al. ............ 345/173 |
| 2006/0284830 | A1 * | 12/2006 | Larsen et al. .............. 345/156 |
| 2007/0200735 | A1 * | 8/2007 | Stilley et al. ................ 341/22 |
| 2007/0268259 | A1 * | 11/2007 | Griffin et al. .............. 345/169 |
| 2008/0055275 | A1 * | 3/2008 | Orsley ...................... 345/175 |
| 2008/0073993 | A1 * | 3/2008 | Sortore et al. ............. 310/90.5 |
| 2009/0079712 | A1 * | 3/2009 | Levin et al. ............... 345/184 |

FOREIGN PATENT DOCUMENTS

JP 2002-149334 * 5/2002

OTHER PUBLICATIONS

IBM Technical Disclosure Bulletin, Sep. 1992, US (NB9209484; vol. No. 35; Issue No. 4B; p. 484-488) Joystick Function for Touch Sensitive Input Devices Sep. 1, 1992.*

* cited by examiner

Primary Examiner—Prabodh M Dharia
(74) Attorney, Agent, or Firm—Grant D. Kang; Kang Intellectual Property Law, LLC

(57) ABSTRACT

The invention is a pointing device (20) for controlling an on-screen pointer (32). The pointing device (20) has a top body portion (22) for manipulation by the thumb of a user, and a bottom body portion (30) for manipulation by the fingers of the same hand of a user. Relative movement between the top and bottom body portions (22, 30) causes movement of an on-screen pointer (32).

6 Claims, 12 Drawing Sheets

DEVICE FOR CONTROLLING ON-SCREEN POINTER

CROSS-REFERENCE TO RELATED APPLICATIONS

This application claims priority to U.S. Application No. 60/804,310 filed on Jun. 9, 2006. This application further claims priority to U.S. Application No. 60/866,896 filed on Nov. 22, 2006.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to pointing devices for on-screen pointer control.

2. Related Art

A computer mouse is a pointing device used to move an on-screen pointer. Although the mouse is the most common pointing device, there are other pointing devices that are also used to control an on-screen pointer such as a keyboard, trackball, touch pad, and pointing stick.

All of the present pointing devices have advantages and disadvantages, but there is always a need in the art to provide a pointing device that is ergonomically comfortable and efficient.

SUMMARY OF THE INVENTION

The invention is a pointing device that can be used to control an on-screen pointer. The pointing device has two separate body portions, each portion being adapted to be independently moved relative to the other portion. The pointing device also has a round disc magnet disposed in each body portion, four rubber bushings for creating a default space between the two body portions, an optical tracking sensor circuit, a switch in the first body portion for contacting a disc magnet in the second body portion, and four reflective photosensors. The pointing device may communicate with the computer via cord (USB, PS2) or via wireless communication (optical, digital).

In a first embodiment, the pointing device may be suspended in the air. The user may relax back in a chair with hand in lap for comfort. Alternatively, the user may be standing while giving a presentation. In either case, the user will pick up the pointing device and hold it between the fingers and thumb. The user moves the thumb and fingers in opposite directions which moves the first body portion (associated with the user's thumb) and second body portion (associated with the fingers) in opposite directions. The opposing movement in the body portions is detected by the optical circuit, and then moves the pointer on the screen in the same direction as the body portion that is associated with the thumb.

As the pointer is moved to a desired location on the screen, the user just squeezes the device (pushing the two body portions together) and then releases to click on an on-screen location. As the user squeezes the pointing device body portions together, the switch in one body portion contacts the disc magnet in the other body portion. For what is known as a "right click" for personal computers, the user presses and holds the switch for a longer period of time, preferably one or two seconds. Accordingly, it will be apparent that this embodiment does not require a mouse pad for a conventional. In addition, this embodiment does not require a table top for an optical-type mouse, or a table top as a foundation support like a trackball, or any foundational support as required by a keyboard.

When the user releases sideways tension on the device, the two bodies automatically return to center due to magnetic pull. Preferably, the on-screen pointer then also returns to the center of the screen.

In an alternate embodiment, the pointing device may be incorporated into a stationary docking pad. In this embodiment, the pointing device is placed in a docking pad. The docking pad is on a tabletop or other surface. The docking pad has a pad for resting the heel of the hand while the finger tips manipulate a body portion.

In another alternate embodiment, the pointing device may be incorporated into a game pad to control various objects such as crosshairs.

In a further alternate embodiment, the pointing device may be incorporated into a handheld or notebook computer. In this embodiment, the fingers alone move the device instead of finger/thumb manipulation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
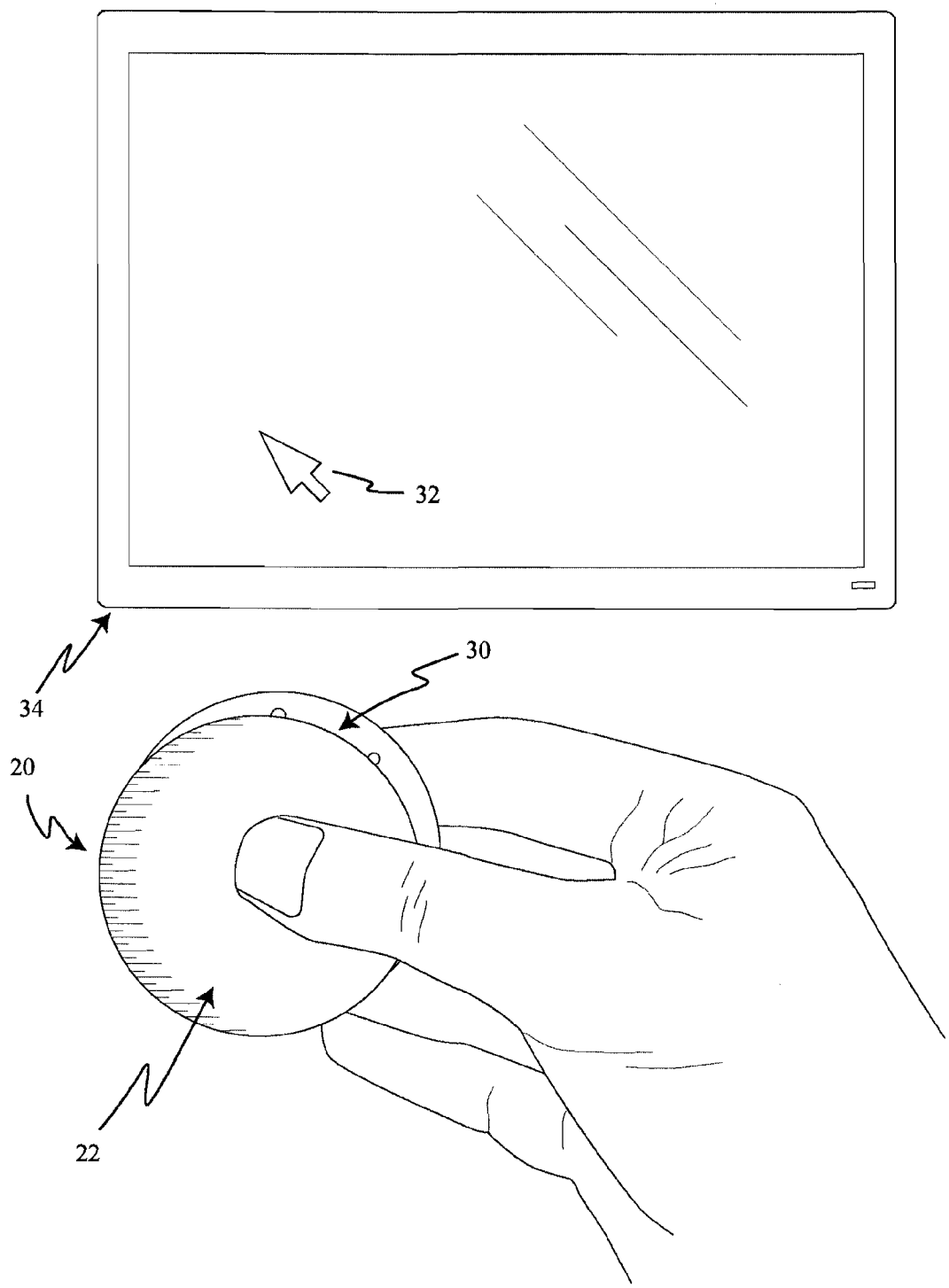
FIG. 1 is a plan view of the present invention illustrating a user's holding a pointing device to move an on-screen pointer.

FIG. 1 illustrates pointing device shown generally at 20 having a top body portion shown generally at 22 and bottom body portion shown generally at 30. Pointing device 20 moves on-screen pointer 32 on a screen shown generally at 34.

Figure 2A:
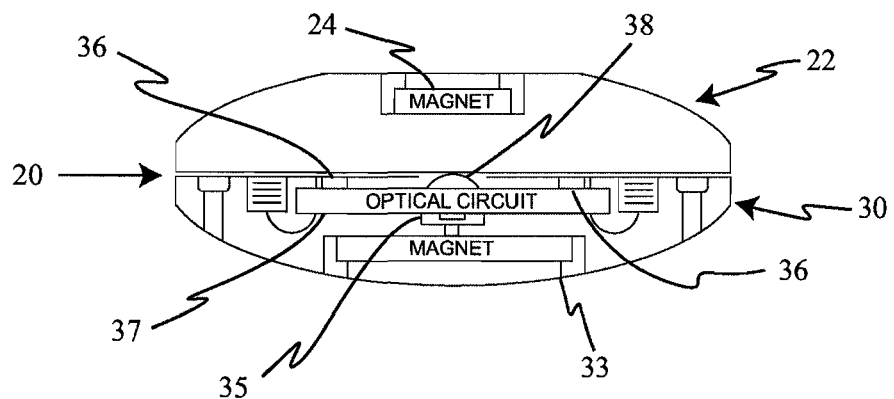
FIG. 2a is a section view of the side of the pointing device.
Figure 7:
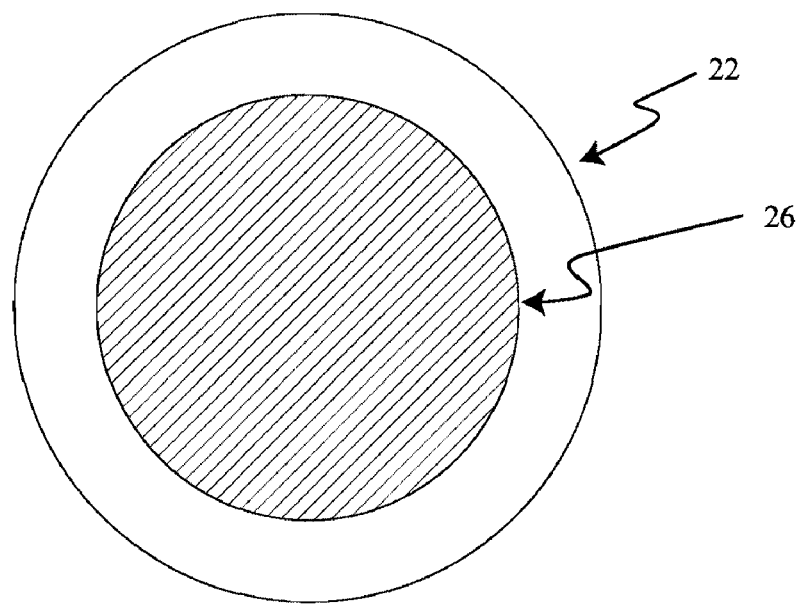
FIG. 7 is a bottom plan view of the top body portion of the pointing device of the present invention.

FIG. 2a illustrates the inner working components of pointing device 20. Top body portion 22 is provided with magnet 24. Magnet 24 is preferably a disc magnet. Top body portion 22 is further provided with a dark area shown generally at 26 (see FIG. 7). Bottom body portion 30 comprises magnet 33, switch 35, photomicrosensor 36, optical circuit 37 and optical light source 38. Preferably, magnet 33 is a disc magnet.

Figure 2B:
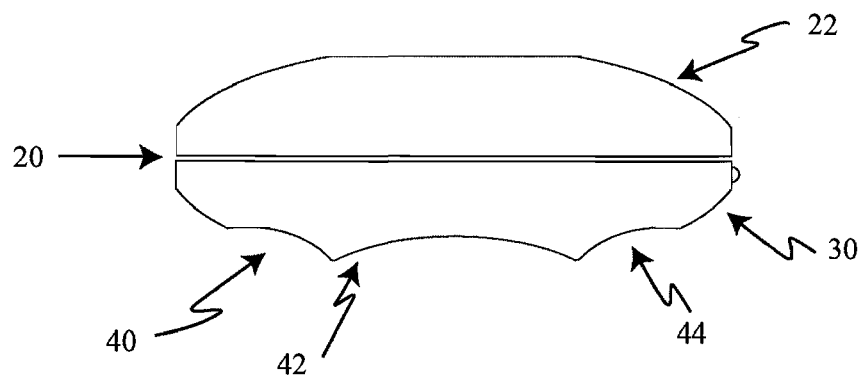
FIG. 2b is a side plan view of the pointing device illustrating one body portion that is contoured to accept three middle fingers of the hand of a user.

In FIG. 2b bottom body portion 30 may alternately be provided with three finger grooves 40, 42, and 44 for receiving the first, middle, and third fingers of the hand of a user. The finger grooves serve to aid the user in orientation of the device. When the three fingers rest in the grooves, the bottom body portion 30 will not spin clockwise or counter-clockwise thus keeping pointer device 20 oriented correctly. Also shown in FIG. 2b is a raised dot on the edge of bottom body portion 30 which indicates the top or "up" position. For clarity, these orientation features such as grooves 40, 42 and 44 are not shown in the other drawing figs. The top body portion 22 may alternately also be provided with a groove (not shown) for receiving the thumb of a user.

Figure 4:
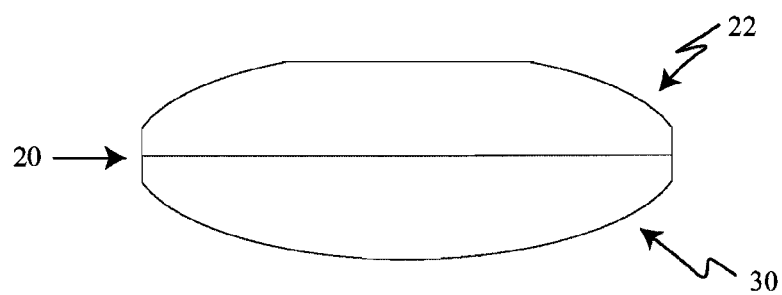
FIG. 4 is a side plan view of the pointing device of the present invention in its biased position.

As shown in FIG. 4, in its biased position pointing device 20 has top body 22 disposed over the top of bottom body 30, preferably with the edges of top body 22 and bottom body 30 in registry.

Figure 5:
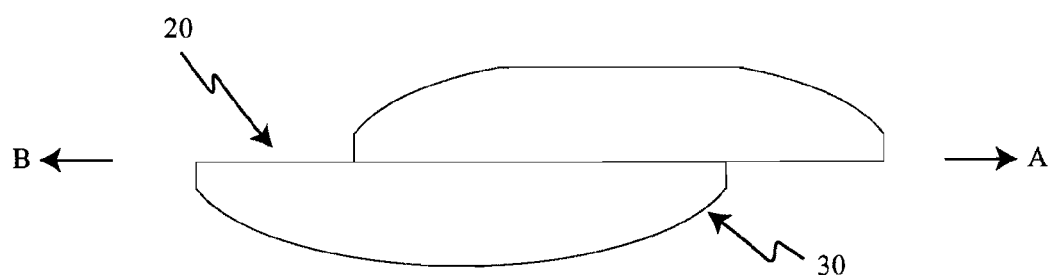
FIG. 5 is a side plan view of the pointing device of the present invention in its non-biased position.

As shown in FIG. 5, as the user exerts opposing lateral directions of force between the thumb and fingers of the hand, top body portion 22 is urged in direction A, and bottom body portion 30 is urged in direction B.

Figure 3:
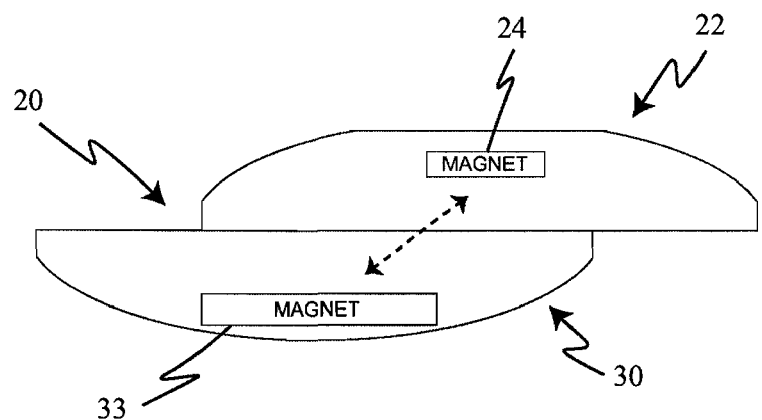
FIG. 3 is a side plan view and partial section view of the pointing device illustrating the relative locations of disc magnets when the pointing device is in an extended position.

As better seen in FIG. 3, magnet 24 of top body portion 22 no longer is disposed directly above magnet 33 of bottom body portion 30. As a result, magnets 24 and 33 exert resistive magnetic forces on top and bottom body portions 22 and 30 to urge each body portion 22, 30 in the direction indicated by the arrows until top body portion 22 assumes its biased position relative to bottom body portion 30 as shown in FIG. 4. This movement also causes on-screen pointer 32 to return toward the center of the screen 34.

Figure 6:
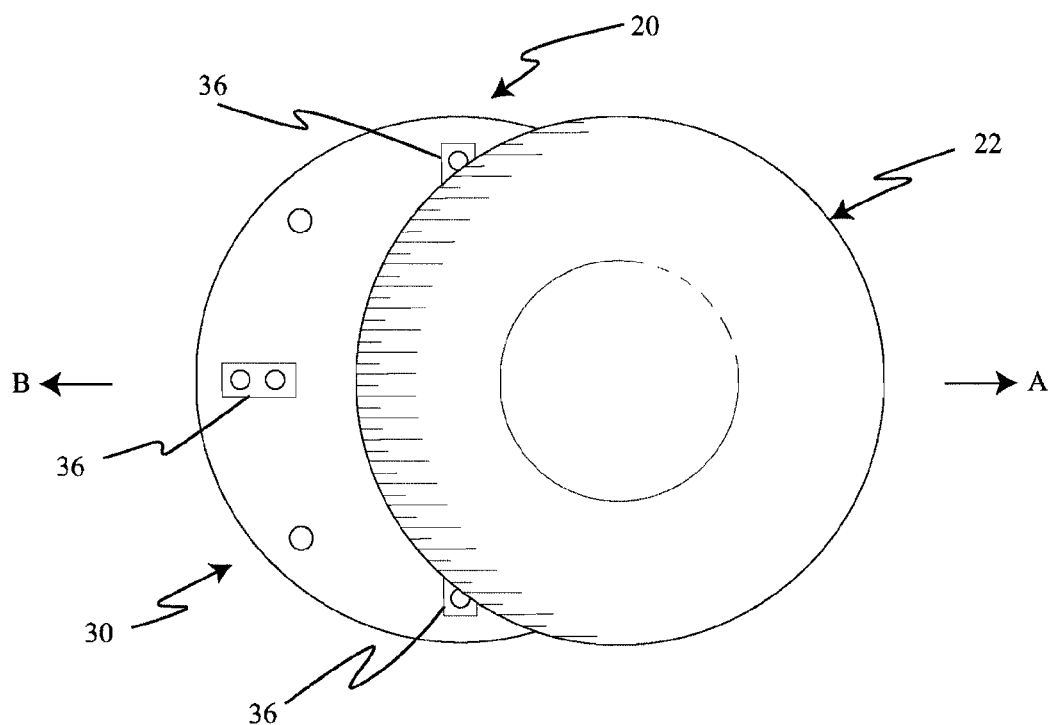
FIG. 6 is a top plan view of the pointing device of the present invention in its non-biased position.

FIG. 6 is a top plan view of a non-biased position in FIG. 5 of top body portion 22 and bottom body portion 30. In FIG. 6, photomicrosensors 36 can be seen.

Figure 8:
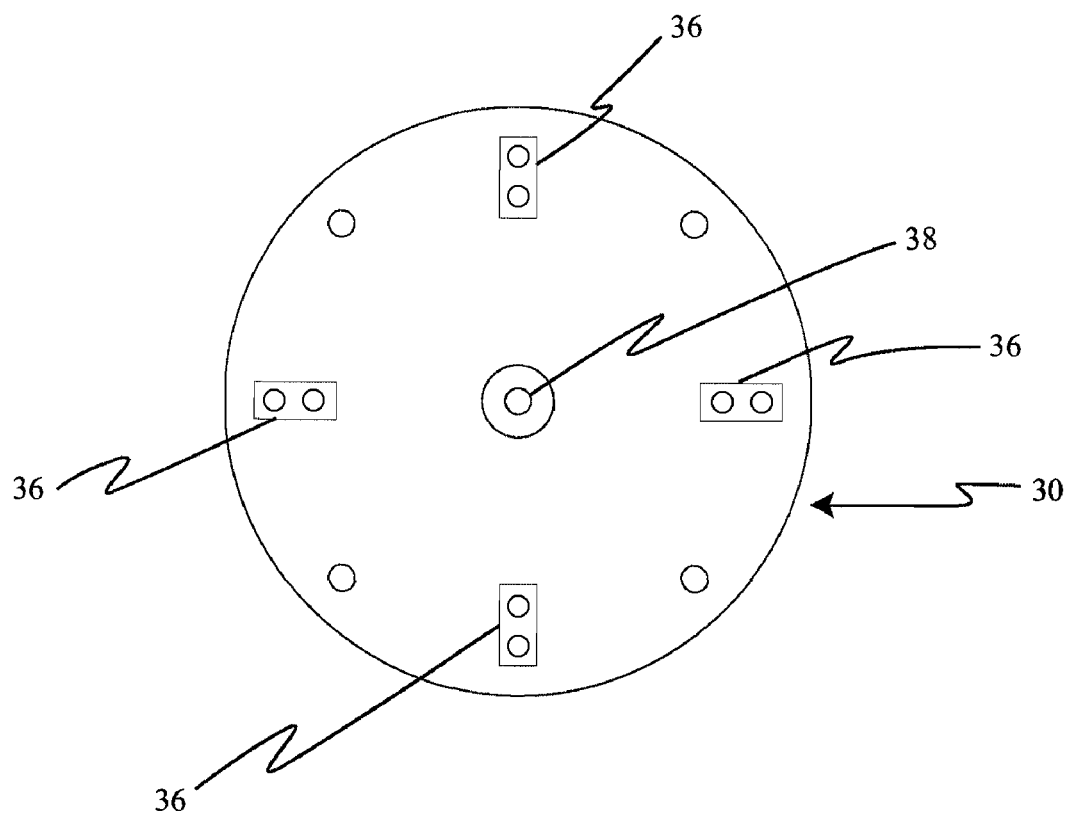
FIG. 8 is a top plan view of the bottom body portion of the pointing device of the present invention.

The photomicrosensors 36 seen in FIG. 6 are more fully seen in FIG. 8. The photomicrosensors 36 each have their own light sources so they do not need the light of the optical circuit 37—light source 38 combination to function properly. Each photomicrosensor 36 has its own emitter/detector pair thus having its own light source. When the device is centered, the white ring (surrounding dark area 26 seen in FIG. 7) lines up with all four photomicrosensors 36 which reflect light independently into each detector of each photomicrosensors 36, thus turning each photomicrosensor 36 ON. This ON state tells the optical circuit 37 to center on-screen pointer 32. If one photomicrosensors 36 detects dark area 26 (or the absence of the white ring), then the on-screen pointer 32 is not centered on screen 34.

The combination of optical light source 38 reflecting against dark circle area 26 and subsequent sensor information processing by optical circuit 37, serve to identify relative displacement between top body portion 22 and bottom body portion 30, and thus defines the travel of on-screen pointer 32 on screen 34. In other words, as a function of the relative displacement between top body portion 22 and bottom body portion 30, pointer device 20 communicates (wirelessly or by cable) to effect movement of on-screen pointer 32 on screen 34.

Figure 9:
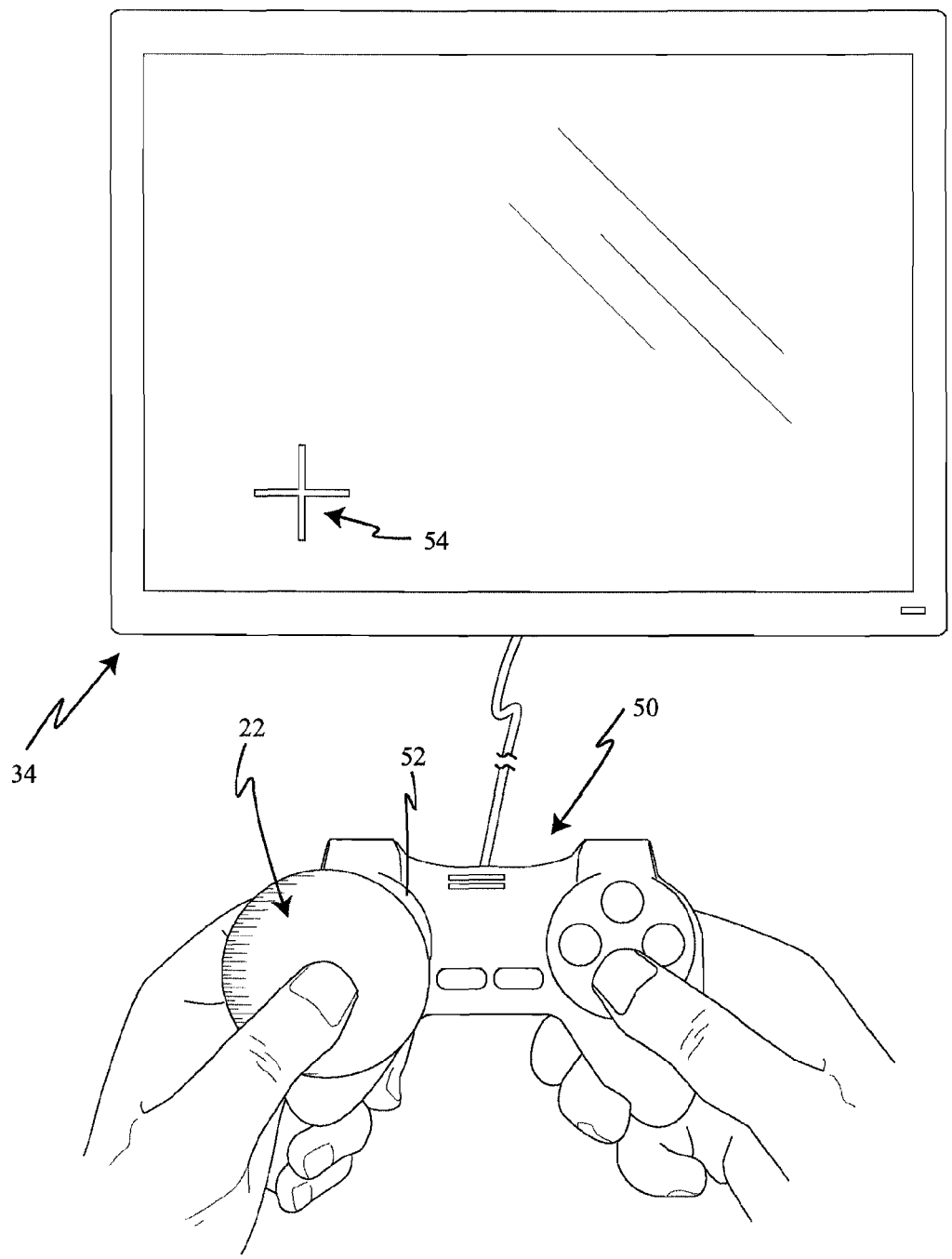
FIG. 9 is a plan view of a second embodiment of the present invention illustrating a user's holding a pointing device that is incorporated into a game controller to move an on-screen pointer.

In an alternate embodiment, pointer device 20 may be incorporated into a game controller shown generally at 50 in FIG. 9. Game controller 50 has top body portion 22 disposed above game controller bottom body portion 52. Any relative displacement between top body portion 22 and game controller bottom body portion 52 will result in the communication of displacement information to move a gaming object shown generally at 52 on screen 34. It will be appreciated that on-screen gaming object 54 may be a pointer, or any other object such as crosshairs 54. As the user moves top body portion 22 relative to game controller bottom body portion 52, on-screen gaming object 54 moves on screen 34.

Figure 10:
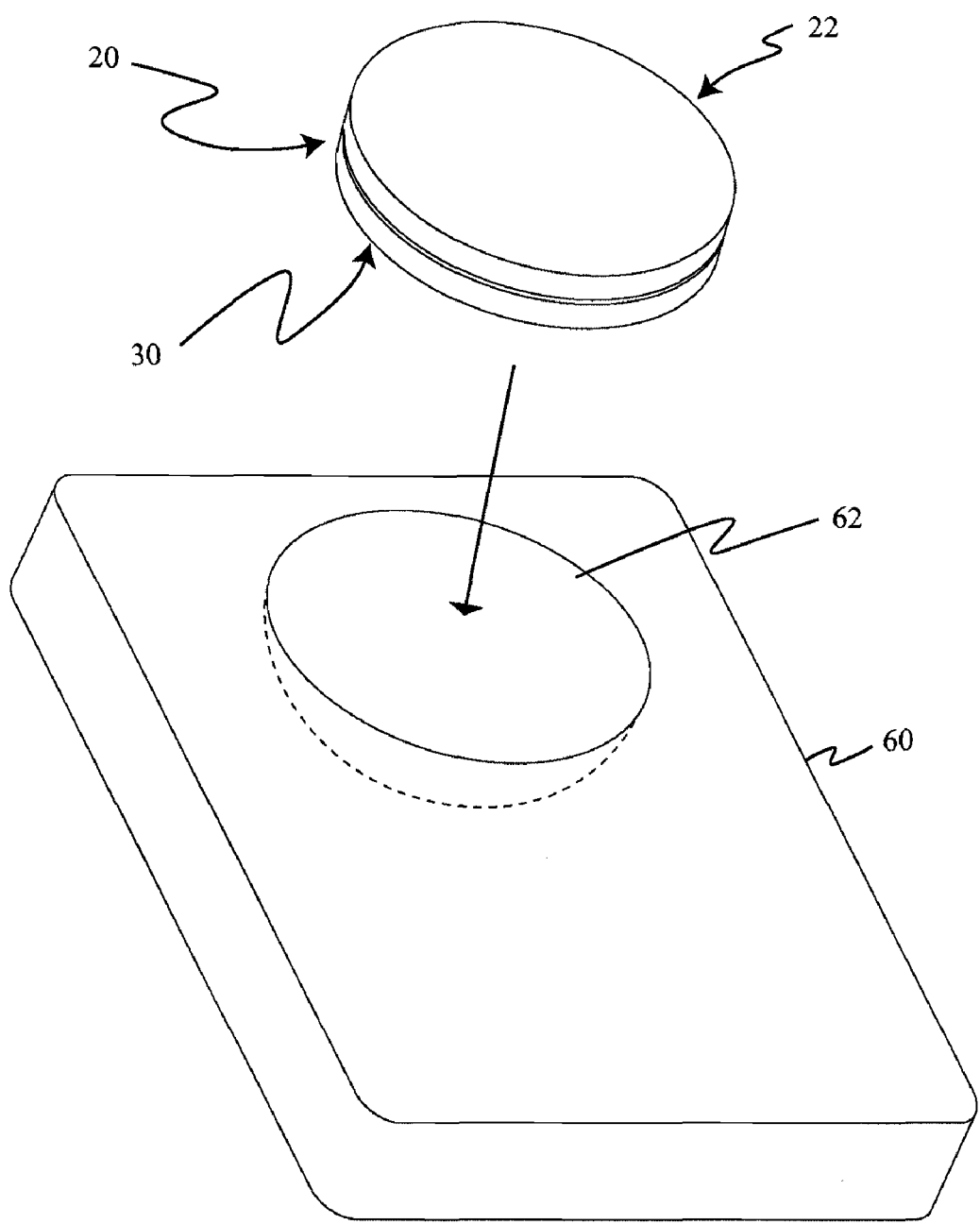
FIG. 10 is a perspective view of a third embodiment of the pointing device of the present invention illustrating a pointing device that is incorporated into a docking bed or docking pad.

A further alternate embodiment is shown in FIG. 10. In FIG. 10, pointing device 20 is disposed on docking bed or pad 60. Docking bed 60 is provided with a cavity 62 that is adapted to receive bottom body portion 30. In use, a user may place pointing device 20 into docking bed 60 which is disposed on a surface. Then, by using finger tip manipulation on top body portion 22, the on-screen pointer (not shown) may be moved on screen 34.

Figure 11:
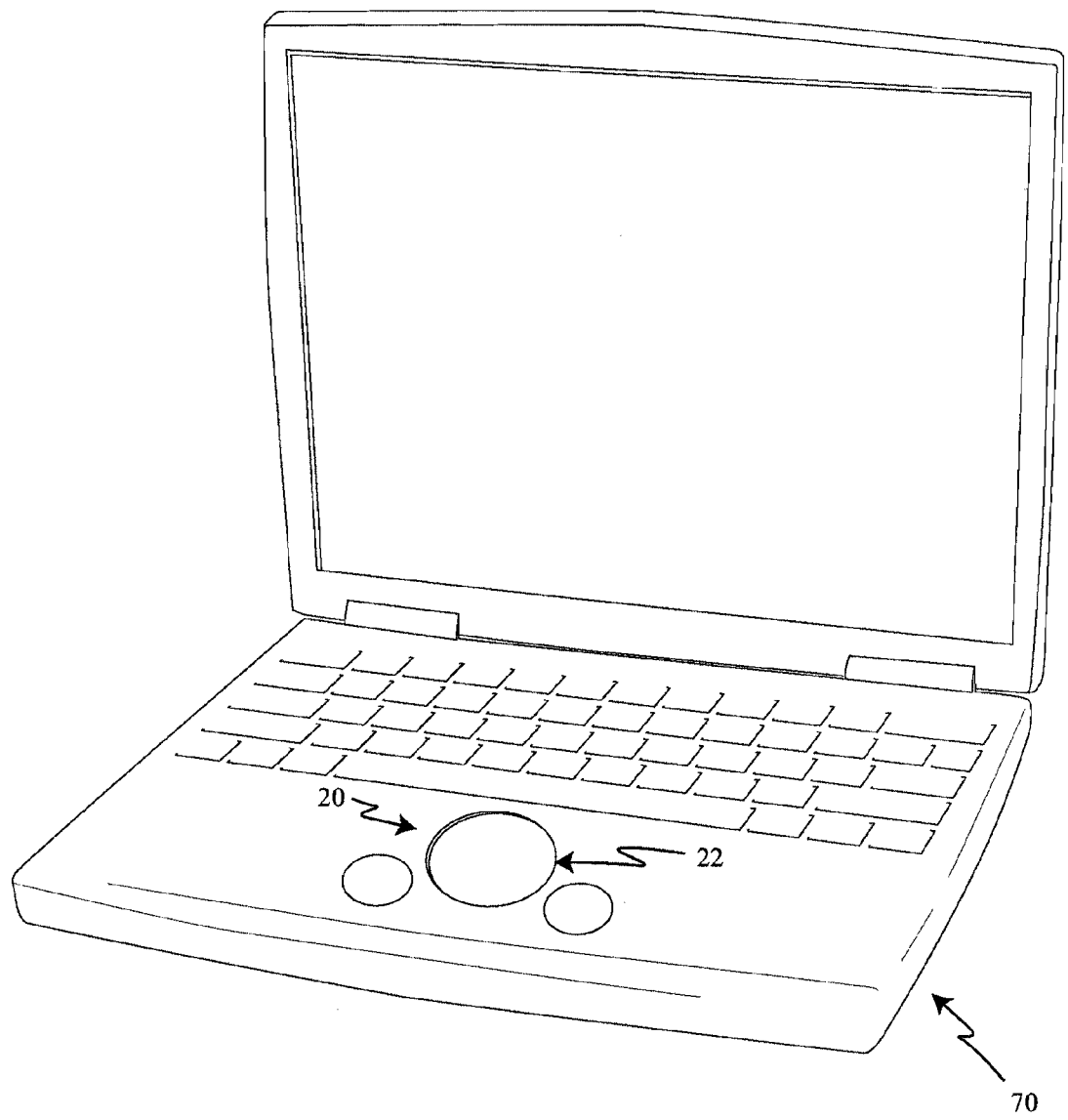
FIG. 11 is a perspective view of a fourth embodiment of the present invention wherein the pointing device is incorporated into a laptop computer.

Another alternate embodiment is shown in FIG. 11. In FIG. 11, pointing device 20 is incorporated into a laptop computer shown generally at 70. In this embodiment, only top body 22 is visible. Top body portion 22 may be flattened to a flat disc and is manipulated to move on-screen pointer (not shown).

To use pointing device 20, a person will pick up pointing device 20 and hold it between the figures and thumb. Specifically, the thumb will contact top body portion 22, and the fingers will contact bottom body portion 30. At rest in the biased position, pointing device 20 appears as shown in FIG. 4. The thumb and fingers are then moved in opposite directions to move top body portion 22 and bottom body portion 30 in opposite directions. This movement is recognized by optical circuit 37. Specifically, light is emitted from optical source 38 and reflecting against dark area 26 and sensed by photomicrosensors 36, and then processed by optical circuit 37. Optical circuit 37 moves the on-screen pointer 32 in the same direction as the user's thumb (or in the same direction as top body portion 22). Optical circuit 37 may be of the common type found in today's optical mice, or may be substituted by other optical circuits or other sensing technologies to improve tracking.

After the pointer in moved to a desired location on the screen, the user can squeeze top body portion 22 against bottom body portion 30 and then release to click on an on-screen object. In particular, squeezing causes switch 35 to be compressed against lower magnet 33. For a "right click", the user squeezes pointer device 20 and maintains a squeezed position for two seconds before releasing. It is understood that external click buttons (not shown) on pointing device instead of a single internal switch 35 may be employed. In this case, for balance, it would be preferred that external buttons (not shown) be placed in center groove 42.

In the event of removal of top body portion 22 from bottom body portion 30, on-screen pointer 32 may drift substantially. For re-centering, top body portion 22 is placed back on bottom body portion 30, and the magnets 24 and 33 physically re-center the portions 22 and 30 together. When a uniform amount of light is detected by all photomicrosensors 36 and the pointer 20 has not been in motion for one second, pointing device 20 will center on-screen pointer 32 to the center of the screen 34.

Because the location of the top body portion 22 determines the location of on-screen pointer 32, when the on-screen pointer 32 reaches the edge of screen 34 and top body portion 22 continues to move left, pointing device 20 does not discard this position information and on-screen pointer 32 will not begin to move to the right until top body portion 22 is moved to the right a distance equal to the distance between its current location and the location that determined the leftmost travel of the on-screen pointer 32.

An alternate pointer control system discards biasing the on-screen pointer 32 to the center of screen 34. Instead, when top body portion 22 is moved so that optical circuit 37 detects a white ring, on-screen pointer 32 will continue to move at a constant speed, and will stop at the edge of screen 34, or will stop when top body portion 22 is moved back such that optical circuit 37 detects dark area 26. Photomicrosensors 36 are not needed and do not operate in this alternate pointer control system because photomicrosensors 36 are used to bias the on-screen pointer 32 to the center of screen 34. If there is no longer any bias, then there is no longer any need for photomicrosensors 36.

If on-screen pointer 32 is not moved for five seconds, or some other length of time, on-screen pointer 32 will disappear from the screen 34, and will re-appear as soon as top body portion 22 is moved.

Figure 12:
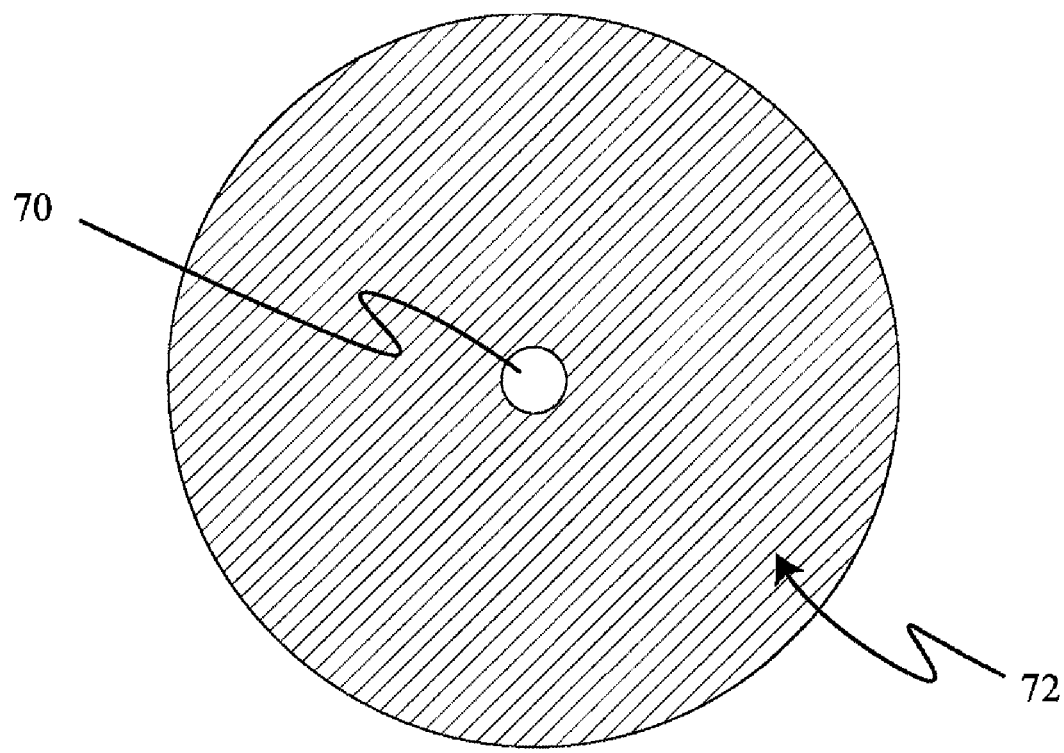
FIG. 12 is a bottom plan view of the top body portion of an alternate pointing device of the present invention.

When a person uses pointing device 20, the person can, out of curiosity or excessive force, move the top body portion 22 too far (or even remove top body portion 22). This excessive travel results in the inability to detect the dark circle area 26. Practically speaking, excessive relative travel may cause the on-screen pointer 32 to drift substantially. After top body portion 20 is placed back on bottom body portion 30, pointing device 20 is physically re-centered. As shown in an alternative embodiment in FIG. 12, there is provided a white circle shown generally at 70 centered on the bottom surface of top body portion 22. The remainder of this surface is a darker area shown generally at 72. Thus, when top body portion 22 is aligned with bottom body portion 30 (by simply releasing the top body portion 22 due to magnetic pull), optical circuit 37 will detect white circle 70 on the bottom of top body portion 22. Optical circuit 37 will perform a frame capture after pointing device 20 has been stationary for a predetermined amount of time, preferably a few seconds. Then, this information will be processed to determine whether or not the pixels are all white. The processing is accomplished either through the optical circuit 37 itself, or by sending information to the computer (not shown). If the pixels are determined to be all-white, the on-screen pointer 32 is centered on the white circle 70. It is very important to recognize that with this alternate embodiment, the need for any photomicrosensor 36 is eliminated because all of the work is being done instead by optical circuit 37. Accordingly, this alternate embodiment is more economical to produce because it uses fewer parts.

Alternate Motion Sensing Embodiments

The common touch pad may be used as the fundamental basis for an alternate motion sensing technology in this device 20 to track the position between the top and bottom body portions 22, 30. A touch pad according to the prior art operates on a principle involving a mutually balanced capacitance design. Specifically, the touch pad is mounted onto a printed circuit board where the user's finger glides. Above the electrically insulating surface of the circuit board, a sensor grid that comprises the touch pad responds to precise finger movements. The touch pad detects small imbalances in capacitance rather than pressure of the touch.

Although the common implementation of a touch pad is for relative positioning, the sensor grid is highly positional and is capable of directly and absolutely correlating a finger touch on the pad to the position of an on-screen pointer. So, in this absolute position mode, if the user touches the lower left corner of the touch pad, the on-screen pointer will immediately move to the lower left corner of the screen without having to drag the finger to this point.

Figure 13:
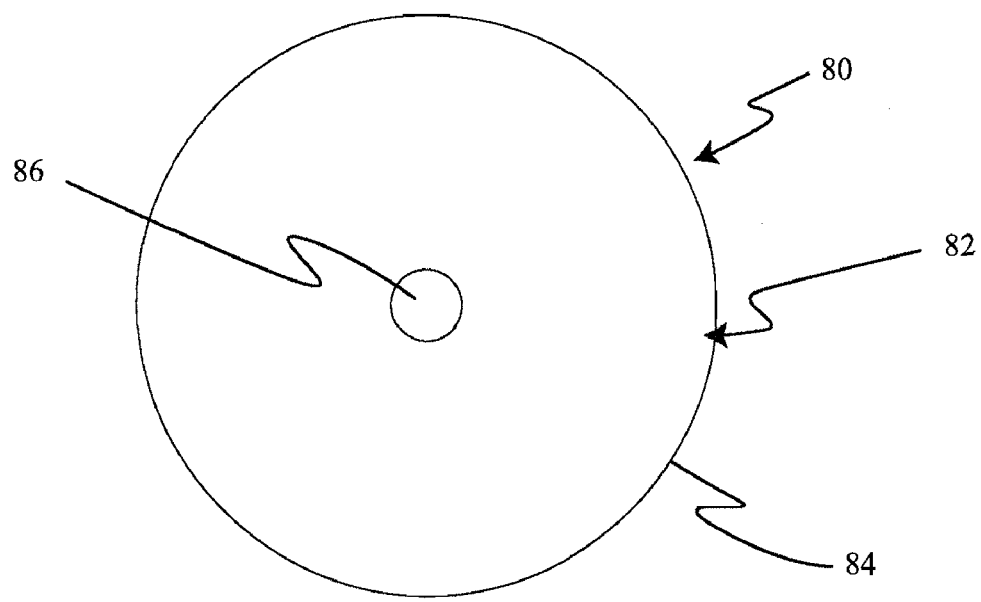
FIG. 13 is another alternate embodiment of the present invention showing a plan view of the bottom of a top body portion.
Figure 14:
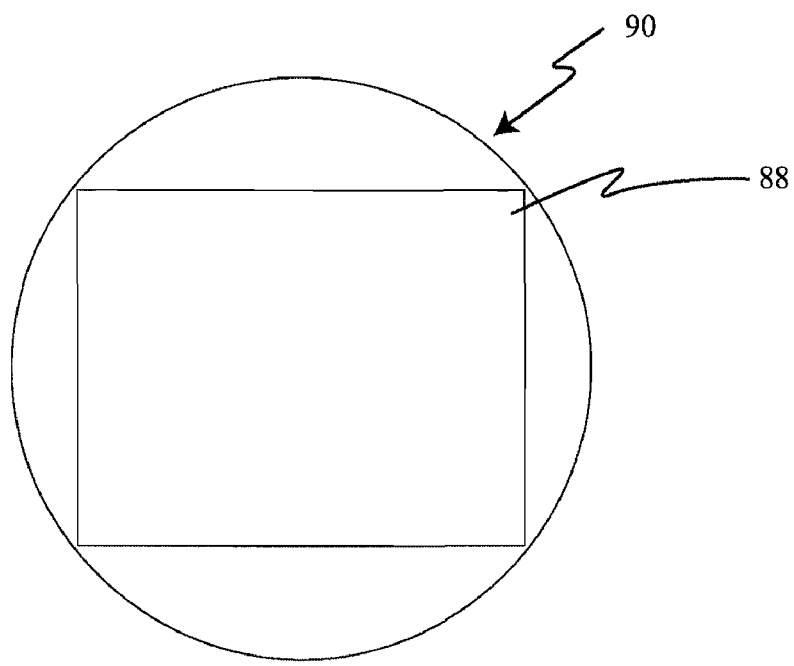
FIG. 14 is a bottom body portion of the alternate embodiment of FIG. 13.
Figure 15:
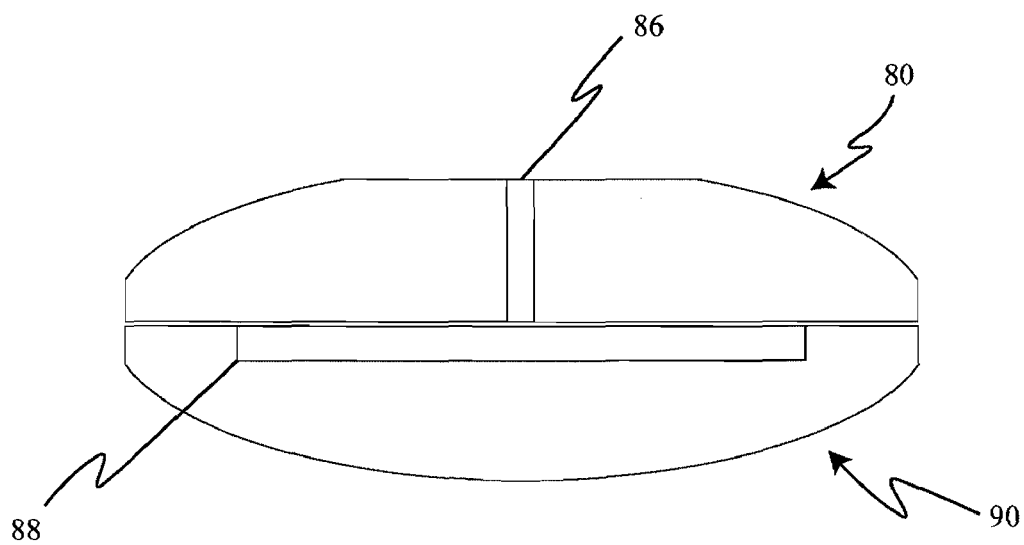
FIG. 15 is a sectional view of the pointing device of FIGS. 13-14.

The inventor has devised a way to incorporate a touch pad with its accompanying circuitry into a pointing device 20 according to the present invention to track the position of the top body portion 22 of the pointing device 20. In this alternate embodiment, shown in FIGS. 13-15, the bottom 84 of top body portion 80 has a regular surface 84, and a centrally-located cylindrical core magnet 86. In addition to physically centering the top body portion 80 and bottom body portion 90, this magnet 86 will provide an electrical path from the user's thumb to the surface of the touch pad 88 on bottom body portion 90. Centrally-located core 86 consists of a common metal cylindrical magnet 86 as best seen in FIGS. 13 and 15. As can be seen in FIG. 13, the cylindrical magnet 86 is preferably contoured to extend downward in a rounded or arcuate shape to minimize contact damage. In FIG. 14, the bottom body portion 90 has a touch pad surface 88.

When top body portion 80 and the bottom body portion 90 are put together, the bottom side of the magnet 86 in the top body portion 80 touches the surface of the touch pad 88, in lieu of a finger as shown in FIG. 15. When a user holds the pointing device 20, a finger, preferably a thumb, will always touch the top of the magnet 86. Thus, due to the conductivity of the metal in the magnet 86, it is just as if the user had a finger placed on the touch pad. Due to finger contact, wherever the bottom of the magnet 86 moves, so moves the on-screen pointer 32.

Figure 16:
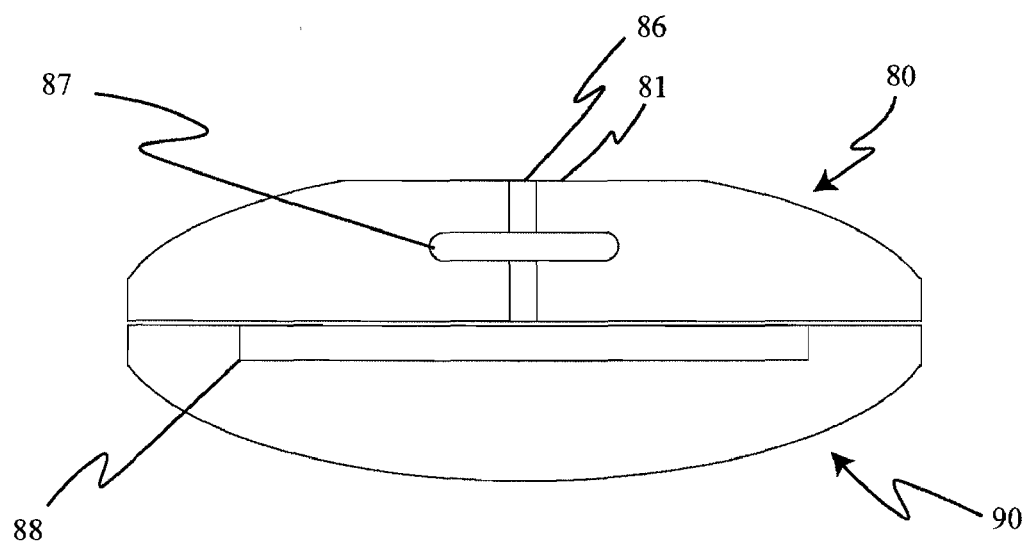
FIG. 16 is a sectional view of an alternate pointing device embodiment of the present invention.

A slightly different embodiment appears in FIG. 16. To increase the surface area of the electrical contact so that it is easier to keep a thumb on it, the top 81 of the top body portion 80 and core 86 may be connected in one single cast unit as seen in FIG. 16. This piece may be made out of titanium as this metal is lightweight and corrosive resistant but other conductive materials may be used. In this alternate embodiment, instead of a cylindrical magnetized core 86, a non-magnetized core 86 and ring magnet 87 are used to create the magnetic field. The non-magnetized core 86 may be metal, or may be non-metal. The remainder of the top body portion 80 and bottom body portion 90 is made of plastic.

A version of this device for those with physical disabilities would incorporate a large touch pad 88 and the bottom body portion 90 would have a flat bottom for desktop use. This device could be very helpful for handicapped individuals who can not grasp a mouse to lift it for repositioning as is a common necessity when using a mouse. Likewise, those who do not have the coordination of a single finger would find this device very useful and preferred over the standard touch pad.

Some users find it uncomfortable to use a touch pad for an extended period of time. The inventor thinks this is due to the high number of sensitive nerves in a user's finger. The embodiments of FIGS. 13-16 provide pointing devices 20 that buffers the user's fingers from the touch pad 88, thus eliminating any friction between the fingers and touch pad 88.

Since the motor control between the human fingers and thumb is finite and since a version of this device with very small diameter may be desired, the inventor proposes an on-screen positioning method using a touch pad which is similar to the alternate method mentioned above in combination with the optical circuit 37 in which case an outer ring 26 on the bottom of the top body portion 22 was sensed by the optical circuit 37.

Figure 17:
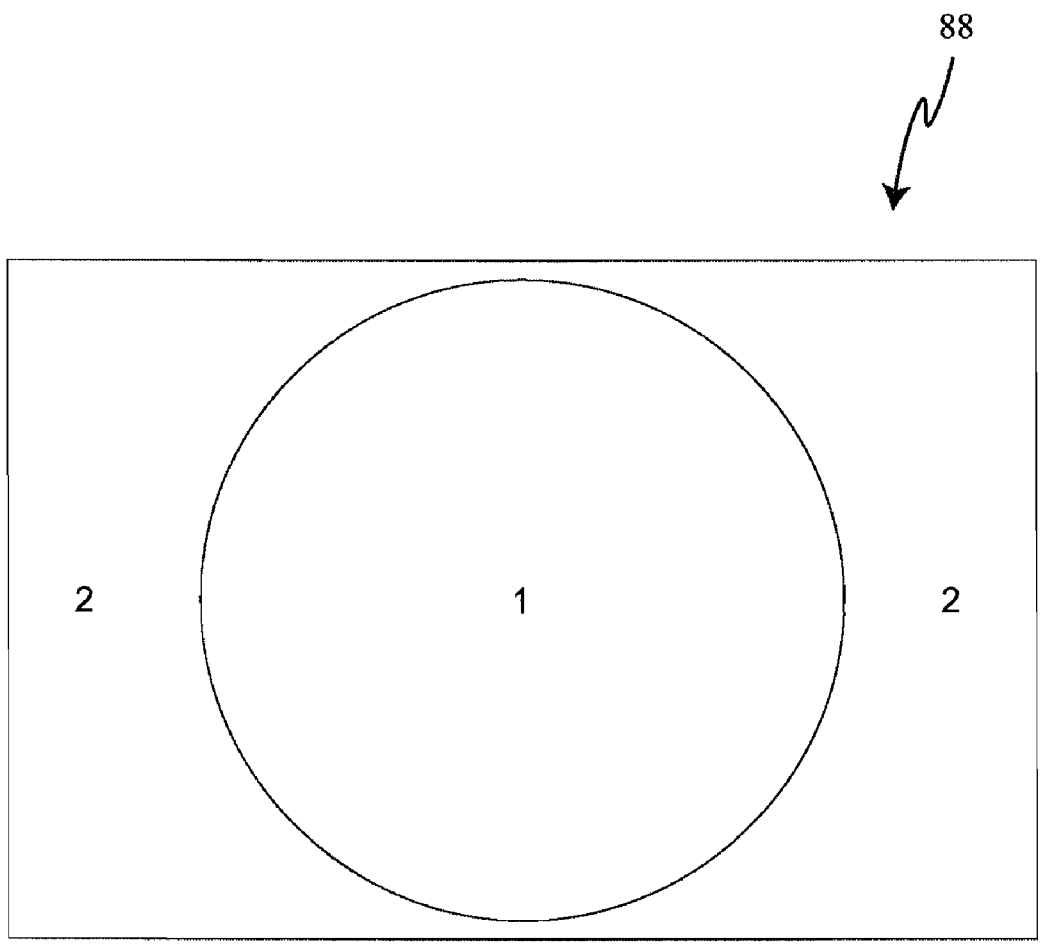
FIG. 17 is a plan view of the top surface of the bottom body portion of another alternate embodiment of the present invention.

FIG. 17 shows a touch pad surface shown generally at 88 mapped out into two regions. As the pointing device 20 is used, when the touch point is in region 1, the on-screen pointer 32 travels in the conventional direction. When the touch point enters region 2, the on-screen pointer 32 starts moving at a constant rate in the direction it was heading upon entering region 2. The on screen pointer 32 will continue to move at a constant rate until it either reaches the edge of the screen or the touch point moves back into region 1. In this method, the touch point can only control the on-screen pointer 32 while it is in region 1.

An on-screen circle (not shown) may follow the on-screen pointer 32 for the benefit of the user. When the touch point is in the center of the touch pad 88, the on-screen pointer 32 will be in the center of the on-screen circle (not shown). As the on-screen pointer 32 moves around within this circle (not shown), the circle stays stationary (touch point in region 1). As the on-screen pointer 32 reaches an edge of the circle (touch point crossing over to region 2), the on-screen circle (not shown) will start to move with the on-screen pointer 32 so that the on-screen pointer 32 never goes outside of the on-screen circle. This on-screen circle will help the user know when the on-screen pointer 32 is about to start moving at a constant rate in a set direction.

Additional Alternate Motion Sensing Embodiment

Another on-screen positioning method when using a touch pad in this device is similar to that used by a joystick. In this case, region 1 in FIG. 17 would be much smaller. As the device 20 is used, when the touch point is in region 1, the on-screen pointer 32 goes in the direction of the touch point as in a typical touch pad. This allows for fine positional movement. When the touch point enters region 2, the on-screen pointer moves in a direction along a line that is drawn from the center point of region 1 to the touch point in region 2. As the touch point gets farther and farther away from the center point of region 1, the on screen pointer 32 will move faster and faster.

Implementing this method allows for a very small top body portion 22. For example, in a game pad, the top body portion 22 could be much smaller than the bottom body portion 30. Also, a raised ring (not shown) around the bottom body 30 would help to keep the top body portion 22 from exceeding its bounds when a user is in a frantic state during game play.

Figure 18:
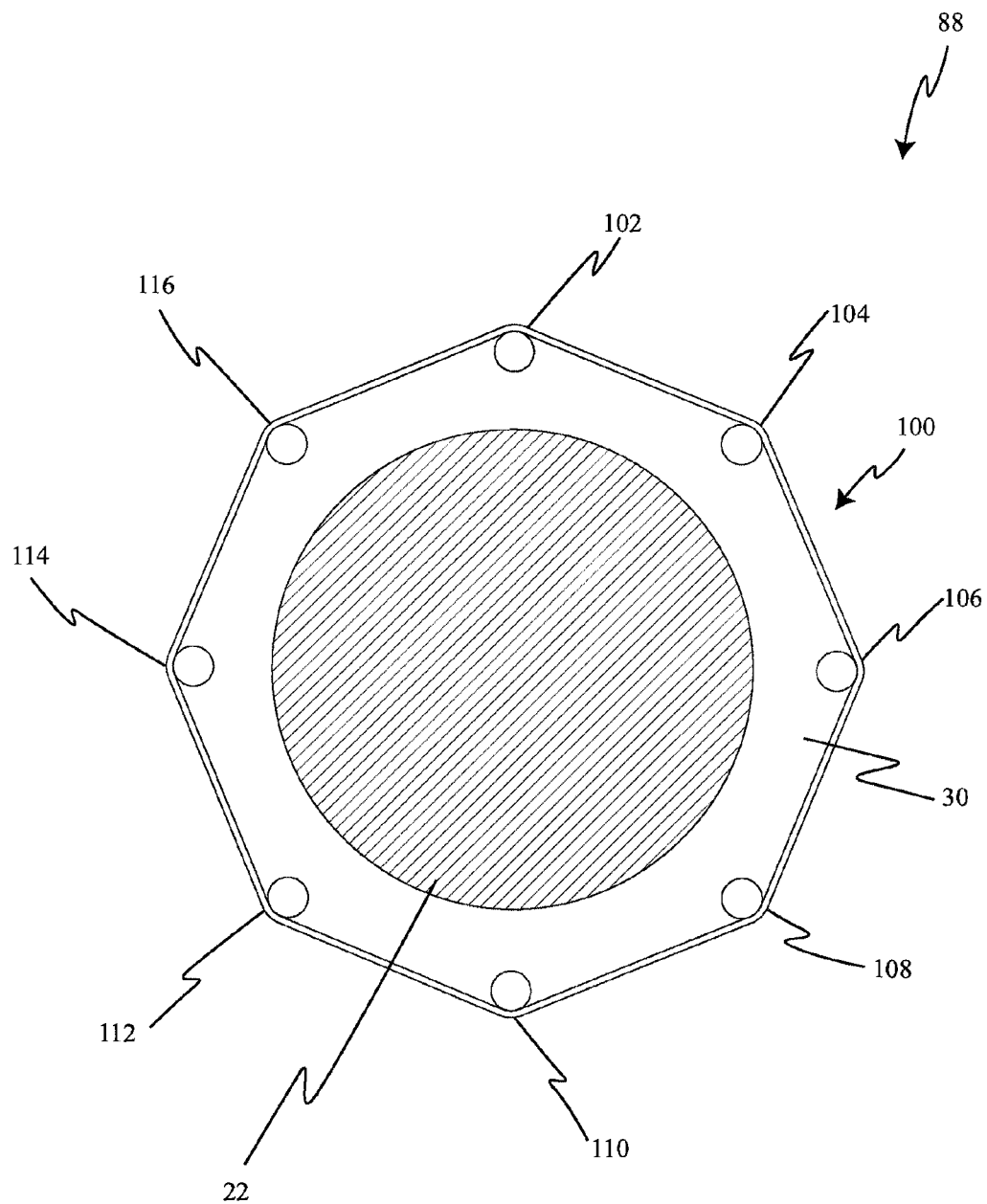
FIG. 18 is a plan view of the top of a control device, according to a further alternative embodiment of the present invention.

Another alternate embodiment is one that can be incorporated into a game controller. Specifically, as shown in FIG. 18, the alternate embodiment is an eight-direction control device shown generally at 100. Control device 100 has top body portion 22, and eight switches, 102, 104, 106, 108, 110, 112, 114, and 116 biased to a neutral position, extending up from and disposed on bottom body portion 30. Top body portion 22 is a flat disc, and rests on a flat surface of bottom body portion 30. In operation, top body portion 22 is moved towards any of the switches, 102, 104, 106, 108, 110, 112, 114, or 116, respectively, using the thumb (or joystick). When top body portion 22 presses against a switch, 102, 104, 106, 108, 110, 112, 114, or 116, respectively, the on-screen pointer 32 moves in that direction. When the thumb is removed, the top body portion 22 returns to a center position due to magnetic pull.

In a typical eight-direction control, the thumb must move in two directions to operate control device 100. First, the thumb must move to find the direction button, and then the thumb must press down to select the direction. In a joystick version of control device 100, the movement of top body portion 22 defines an arc. Because all motion in the proposed control corresponds directly to the on-screen pointer 32, the control device 100 is more comfortable and intuitive to use. Because less movement of the thumb is needed to select direction because the top body portion 22 is biased to a center position, there is less stress on the thumb.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, it is understood that the top or bottom body portion 22, 30 may be made in a variety of shapes and colors for aesthetics. In addition, the two bodies may be provided with a translucent top and be made to glow via light provided on the other body side. Further, dark area 26 may be provided with various patterns to facilitate sensing. Alternately, three photomicrosensors 36 spaced equilaterally may be used instead of four. Thus, the breadth and scope of the present invention should not be limited by any of the above-described exemplary embodiments, but should be defined only in accordance with the following claims appended hereto and their equivalents.

What is claimed is:
1. A hand-held pointing device comprising:
a top body comprising a housing and a magnet disposed inside said housing;
a bottom body comprising a housing and a magnet, said bottom body being slidingly translatable relative to said top body;
a light source disposed in one of said top body and bottom body;
a plurality of photomicrosensors disposed in one of said top body and bottom body for sensing light reflected from said light source;
a switch disposed in one of said top and bottom body; and
an optical circuit for receiving and processing information from said photomicrosensors to determine a relative translational displacement between said top body and bottom body;
wherein said top body has a thumb rest on a top surface thereof and said bottom body has a finger rest on a bottom surface thereof such that said pointing device can be hand-held.

2. The hand-held pointing device according to claim 1, further comprising, a plurality of grooves disposed on said bottom body.

3. The hand-held pointing device according to claim 1, wherein said magnets of said top and bottom body portions are adapted to bias said top and bottom body portions in registry.

4. The hand-held pointing device according to claim 1, wherein said switch is activated by contact between said top body portion and said bottom body portion.

5. A pointing device comprising:

a top body comprising a top body housing with a top portion and a bottom portion, and a core disposed between said top portion and bottom portion of said top body housing and extending through said top portion and bottom portion of said top body housing;

a bottom body comprising a bottom body housing, said bottom body being slidingly translatable relative to said top body;

a touchpad fixedly disposed on said bottom body housing; and wherein said core is electrically conductive and slidingly contacts said touchpad; and wherein a ring magnet is disposed in said top body, said ring magnet being in electrical communication with said core.

6. The pointing device of claim 5, wherein said core is cylindrical between said top portion and bottom portion of said top body housing, and wherein said core is rounded as it extends past said bottom portion of said top body housing.

\* \* \* \* \*